US012649471B2

(12) United States Patent
Aizawa et al.

(10) Patent No.: US 12,649,471 B2
(45) Date of Patent: Jun. 9, 2026

(54) COURSE GENERATION DEVICE, COURSE GENERATION METHOD, MEDIUM, AND MOVING BODY

(71) Applicant: HONDA MOTOR CO., LTD., Tokyo (JP)

(72) Inventors: Koki Aizawa, Wako (JP); Hideki Matsunaga, Wako (JP); Ryoji Wakayama, Wako (JP); Kento Shirakata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 182 days.

(21) Appl. No.: 18/380,823

(22) Filed: Oct. 17, 2023

(65) Prior Publication Data

US 2024/0140431 A1 May 2, 2024

(30) Foreign Application Priority Data

Oct. 26, 2022 (JP) ................................. 2022-171549

(51) Int. Cl.
B60W 30/18 (2012.01)
(52) U.S. Cl.
CPC . B60W 30/18159 (2020.02); B60W 2420/403 (2013.01); B60W 2552/05 (2020.02); B60W 2552/10 (2020.02)
(58) Field of Classification Search
CPC .. B60W 30/045; B60W 30/09; B60W 30/095; B60W 30/18159;
(Continued)

(56) References Cited

U.S. PATENT DOCUMENTS 11,338,803 B2 5/2022 Nakanishi et al.
2015/0375743 A1* 12/2015 Izuhara ........... B60W 30/18145
701/36
(Continued)

FOREIGN PATENT DOCUMENTS

JP 2016-43837 A 4/2016
JP 2019-123270 A 7/2019
(Continued)

OTHER PUBLICATIONS

English translation of WO 2022189121 (Year: 2022).*
(Continued)

*Primary Examiner* — Brandon Z Willis
(74) *Attorney, Agent, or Firm* — WHDA, LLP

(57) ABSTRACT

A course generation device generates course information indicating a course on which a moving body moves. The device outputs a course that the moving body is traveling and a course in the movement destination, generates the course connecting the course that the moving body is traveling to the movement destination, as a curve, estimates or detects an avoidance area to be avoided in traveling, based on an image captured by a camera, and selects again at least one of a start point and an end point of the course to be regenerated, in a case where a distance between the avoidance area and the course is shorter than a predetermined distance, and generates again the course for the distance to be equal to or longer than the predetermined distance.

12 Claims, 6 Drawing Sheets

(58) Field of Classification Search
CPC ....... B60W 30/18145; B60W 60/0011; B60W
60/001; B60W 60/0015; B60W 60/0016;
B60W 60/0017; B60W 2420/403; B60W
2552/05; B60W 2552/10; B60W 2552/53;
B60W 2554/40; B60W 2554/404; B60W
2554/4041; B60W 2554/60; B60W
2554/80; B60W 2554/801; B60W
2554/802; B60W 2754/10; B60W
2754/20; B60W 2754/30; G06V 20/56;
G06V 20/58; G06V 20/588; G08G 1/165;
G08G 1/166; G05D 1/0212; G05D
1/0214; G05D 1/617; G05D 1/622; G05D
1/639; G05D 2107/13
See application file for complete search history.

(56) References Cited

U.S. PATENT DOCUMENTS

| | | | | |
|---|---|---|---|---|
| 2017/0270373 | A1 | | 9/2017 | Kawasaki et al. |
| 2018/0326995 | A1 | * | 11/2018 | Hiramatsu .......... B60W 50/082 |
| 2019/0220021 | A1 | | 7/2019 | Yasui et al. |
| 2020/0073396 | A1 | * | 3/2020 | Shimizu ............... G05D 1/0219 |
| 2020/0242938 | A1 | * | 7/2020 | Suzuki ................... G08G 1/052 |
| 2020/0278684 | A1 | | 9/2020 | Naserian et al. |
| 2022/0229438 | A1 | * | 7/2022 | Nabeta ................. G05D 1/0214 |
| 2022/0333938 | A1 | * | 10/2022 | Han ................ B60W 30/18163 |
| 2023/0304807 | A1 | * | 9/2023 | Choi ................... B60W 60/001 |
| 2024/0034321 | A1 | * | 2/2024 | Umezawa .......... B60W 60/0011 |

FOREIGN PATENT DOCUMENTS

| | | | | |
|---|---|---|---|---|
| JP | | 2020-097276 A | 6/2020 | |
| WO | WO-2022189121 A1 | * | 9/2022 | .......... B62D 15/025 |

OTHER PUBLICATIONS

Office Action dated Aug. 18, 2025, issued in counterpart JP Application No. 2022-171549, with English translation. (10 pages).

* cited by examiner

F I G.  5
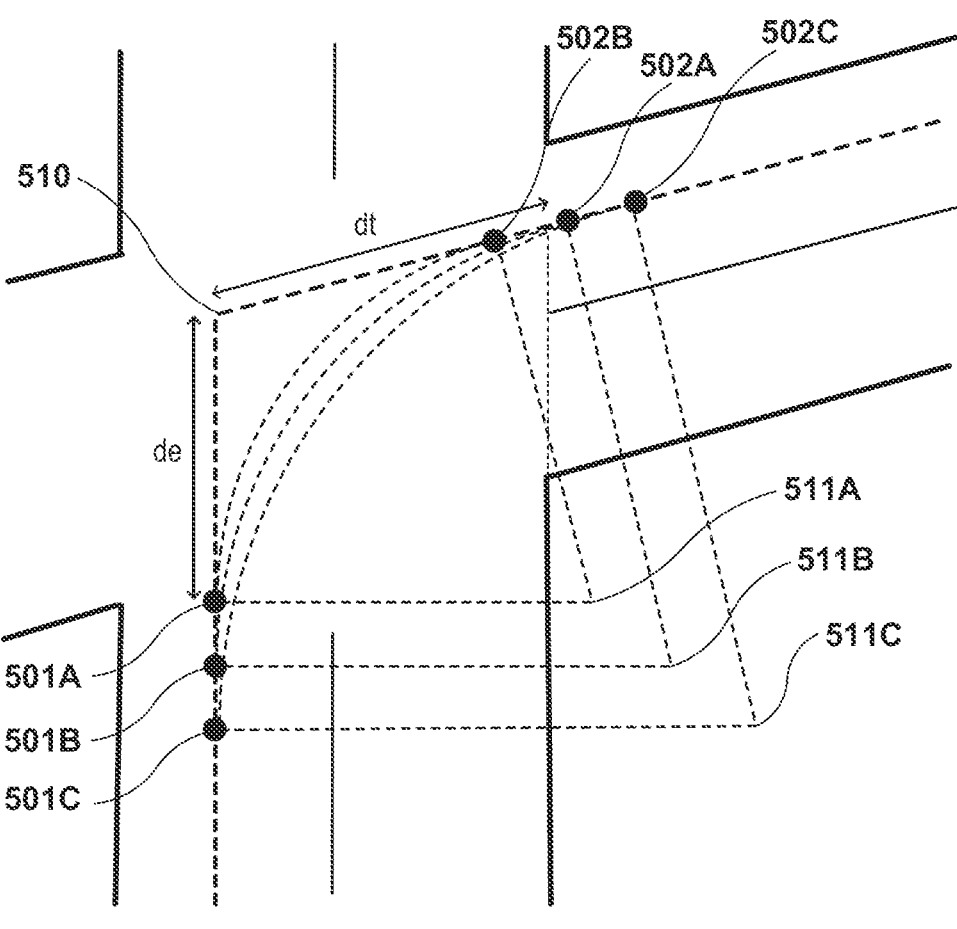

COURSE GENERATION DEVICE, COURSE GENERATION METHOD, MEDIUM, AND MOVING BODY

CROSS-REFERENCE TO RELATED APPLICATION(S)

This application claims priority to and the benefit of Japanese Patent Application No. 2022-171549, filed on Oct. 26, 2022, the entire disclosure of which is incorporated herein by reference.

BACKGROUND OF THE INVENTION

Field of the Invention

The present invention relates to a course generation device, a course generation method, a medium, and a moving body such as a vehicle.

Description of the Related Art

In these years, electric vehicles called ultra-compact mobility vehicles (also referred to as micro mobility vehicles) each having a riding capacity of one or two persons are known. As a technique for controlling traveling of such a vehicle, there has been proposed a technique for acquiring a road image with a camera or the like, estimating a road shape based on the road image that has been acquired, and controlling the traveling (for example, see Japanese Patent Laid-Open No. 2016-43837).

In the technique described in Japanese Patent Laid-Open No. 2016-43837, however, it is possible to control the traveling along a curved road, whereas it is difficult to control a right turn or a left turn at crossroads.

SUMMARY OF THE INVENTION

The present invention achieves control of traveling in order to make a turn safely at crossroads on a traveling path.

The present invention has the following configurations. According to one aspect of the present invention, there is provided a course generation device that generates course information indicating a course on which a moving body moves from a traveling area where the moving body is traveling to a traveling area of a movement destination, the course generation device comprising: at least one processor and at least one memory comprising at least one program, wherein the at least one program is configured to cause the one or more processors to: output a course in the traveling area where the moving body is traveling and a course in a traveling area of the movement destination respectively in a first point sequence and a second point sequence; generate the course information of the course on which the moving body moves from the traveling area where the moving body is traveling to the traveling area of the movement destination, as a curve including a point in the first point sequence as a start point and a point in the second point sequence as an end point; estimate or detect an avoidance area to be avoided in traveling, based on an image captured by a camera; and select again at least one of the start point and the end point, in a case where a distance between the avoidance area and the course is shorter than a predetermined distance, and generate again the course information for the distance to be equal to or longer than the predetermined distance.

According to the present invention, it is possible to achieve control of traveling in order to make a turn safely at crossroads on a traveling path.

BRIEF DESCRIPTION OF THE DRAWINGS

FIG. 5 is a diagram illustrating an example of the course generation at crossroads according to the present embodiment.

DESCRIPTION OF THE EMBODIMENTS

Figure 1A:
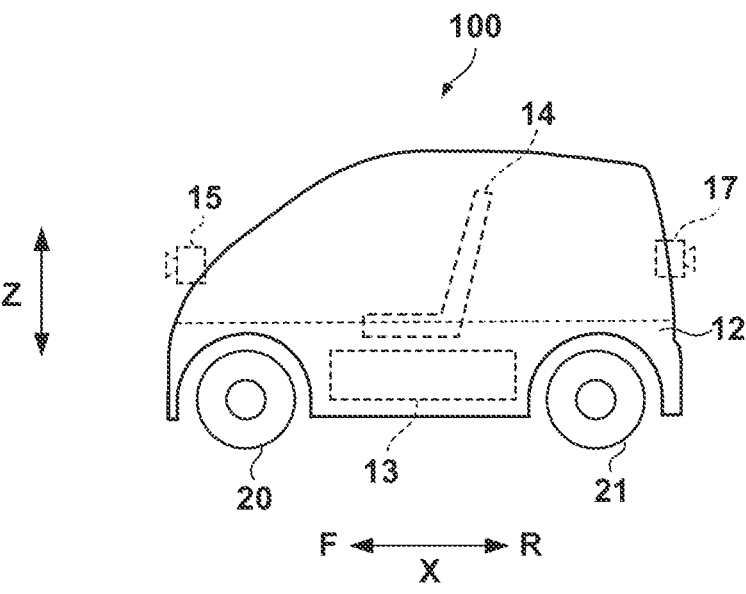
FIGS. 1A and 1B are each a block diagram illustrating a configuration example of a vehicle according to the present embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Configuration of Vehicle

Figure 1B:
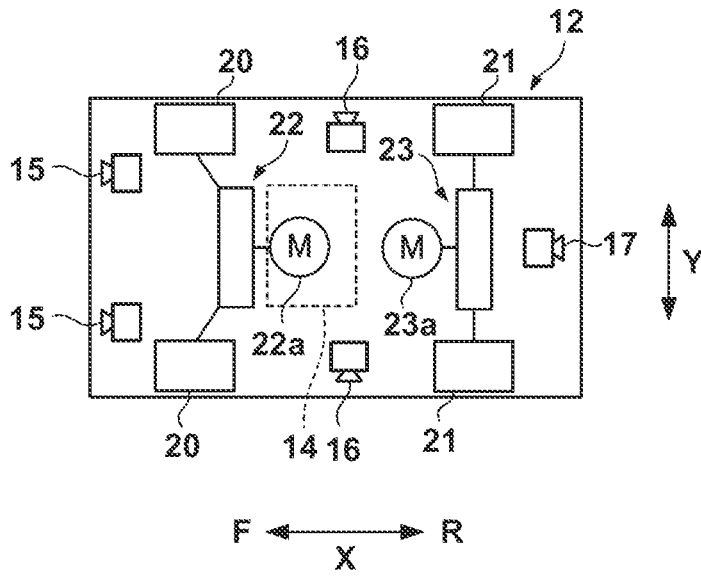

Referring to FIGS. 1A and 1B, a configuration of a vehicle 100, which is an example of a moving body according to the present embodiment, will be described. The vehicle 100 includes a battery mounted thereon, and is, for example, an ultra-compact mobility vehicle that moves mainly with dynamic power of a motor. The ultra-compact mobility vehicle denotes an ultra-small-sized vehicle that is more compact than a general automobile and that has a riding capacity of one or two persons. In the present embodiment, an example in which the vehicle 100 is an ultra-compact mobility vehicle will be described. However, there is no intention to limit the present invention, and for example, a three-wheeled vehicle or a straddle type vehicle may be used. In addition, the vehicle of the present invention is not limited to a riding apparatus, and may be any vehicle loaded with luggage and moving in parallel with a person who is walking, or a vehicle leading the way for a person.

FIG. 1A illustrates a side surface of the vehicle 100 according to the present embodiment, and FIG. 1B illustrates an internal configuration of the vehicle 100. In the drawings, an arrow X indicates a front-and-rear direction of the vehicle 100, F indicates a front side, and R indicates a rear side. Arrows Y and Z respectively indicate a width direction (a left-right direction) and an up-down direction of the vehicle 100.

The vehicle 100 is an electric autonomous vehicle including a traveling unit 12 and using a battery 13 as a main power supply. The battery 13 is, for example, a secondary battery such as a lithium ion battery, and the vehicle 100 self-travels on the traveling unit 12 by the electric power supplied from the battery 13. The traveling unit 12 is a four-wheeled vehicle including a pair of left and right front wheels 20 and a pair of left and right rear wheels 21. The traveling unit 12 may be in another form such as a form of a tricycle. The vehicle 100 includes a seat 14 for one person or two persons.

The traveling unit 12 includes a steering mechanism 22. The steering mechanism 22 is a mechanism that changes the steering angle of the pair of front wheels 20 using a motor 22*a* as a drive source. An advancing direction of the vehicle 100 can be changed by changing the steering angle of the pair of front wheels 20. The traveling unit 12 also includes a drive mechanism 23. The drive mechanism 23 is a mechanism that rotates the pair of rear wheels 21 with a motor 23*a* as a drive source. By rotating the pair of rear wheels 21, it is possible to move the vehicle 100 forward or rearward.

The vehicle 100 includes detection units 15 to 17 for detecting target objects in the surroundings of the vehicle 100. The detection units 15 to 17 are a group of external sensors that monitor the surroundings of the vehicle 100. In the case of the present embodiment, any of them is an imaging device for capturing images of the surroundings of the vehicle 100, and includes, for example, an optical system such as a lens and an image sensor. However, instead of or in addition to the imaging device, it is possible to adopt a radar or a light detection and ranging (LiDAR).

Two detection units 15 are disposed on a front part of the vehicle 100 to be separated from each other in Y direction, and mainly detect target objects on a forward side of the vehicle 100. The detection units 16 are disposed respectively on a left lateral part and a right lateral part of the vehicle 100, and mainly detect target objects on lateral sides of the vehicle 100. The detection unit 17 is disposed on a rear part of the vehicle 100, and mainly detects target objects on a rearward side of the vehicle 100. The detection unit 15 is a camera in the present embodiment, captures an image with the forward side as the center, and detects a target object included in the image.

Control Configuration of Moving Body

Figure 2:
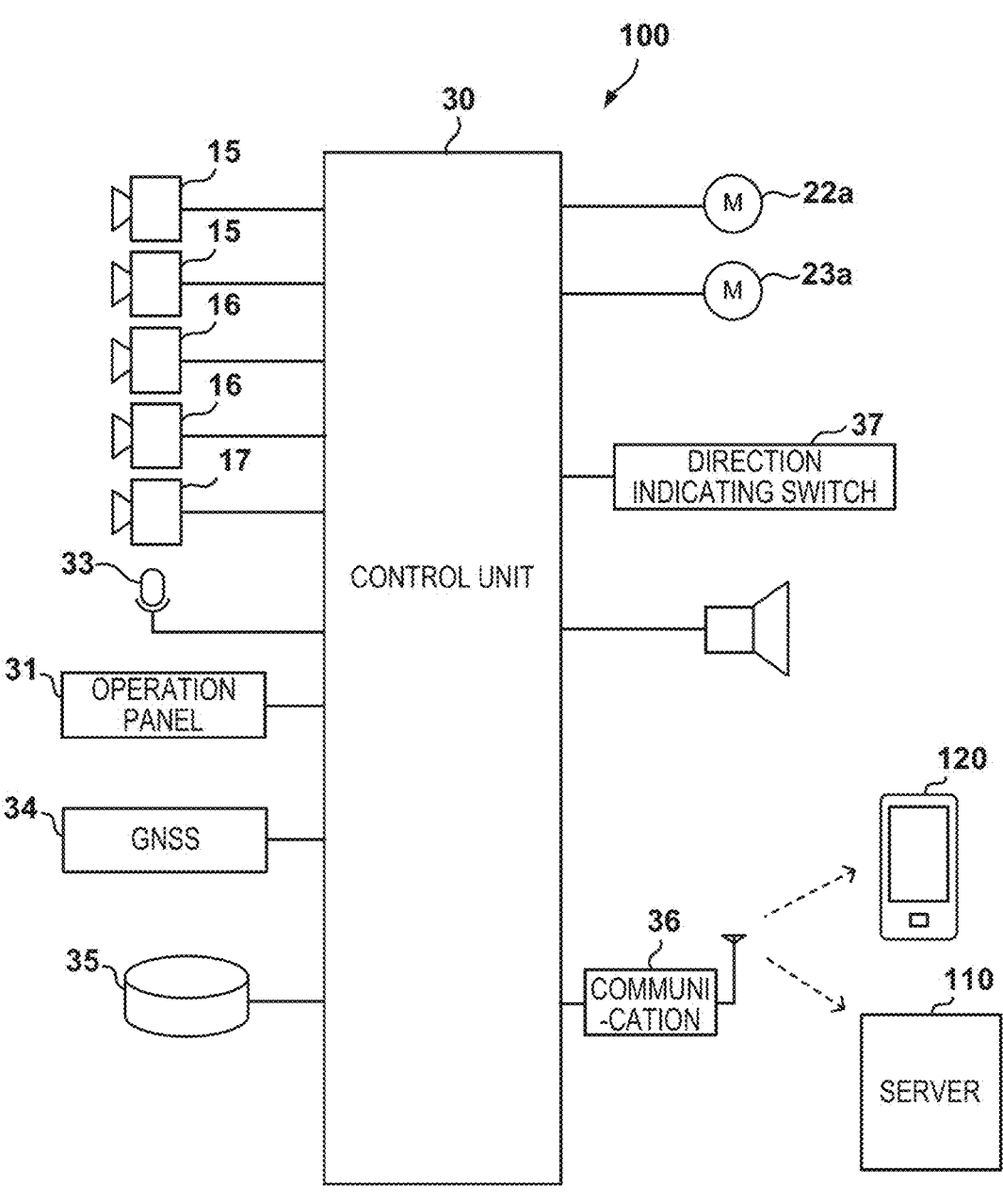
FIG. 2 is a block diagram illustrating a hardware configuration example with a control unit of a vehicle as a main component, according to the present embodiment.

FIG. 2 is a block diagram of a control system of the vehicle 100, which is a moving body. Here, a configuration necessary for carrying out the present invention will be mainly described. Therefore, any other configuration may be further included in addition to the configuration to be described below. The vehicle 100 includes a control unit (ECU) 30. The control unit 30 includes a processor represented by a CPU, a storage device such as a semiconductor memory, an interface with an external device, and the like. The storage device stores a program to be executed by the processor, data used for processing by the processor, and the like. A plurality of sets of the processor, the storage device, and the interface may be provided for each function of the vehicle 100 to be capable of communicating with each other.

The control unit 30 acquires detection results of the detection units 15 to 17, input information into an operation panel 31, voice information that has been input from a voice input device 33, a control command (for example, transmission of a captured image or a current position, or the like) from a server 110, and the like, and performs corresponding processing. The control unit 30 conducts controls of the motors 22*a* and 23*a* (controls traveling of the traveling unit 12), conducts display control of the operation panel 31, gives notification to an occupant of the vehicle 100 by sound, and outputs information. The control unit 30 may be implemented by an information processing device or a computer that performs information processing.

The voice input device 33 collects voices of an occupant of the vehicle 100. The control unit 30 is capable of recognizing the voices that have been input and performing corresponding processing. A global navigation satellite system (GNSS) sensor 34 receives a GNSS signal to detect a current position of the vehicle 100. A storage device 35 is a mass storage device that stores map data and the like including information of roads on which the vehicle 100 is capable of traveling, landmarks such as buildings, stores, and the like. Also in the storage device 35, programs to be executed by the processor, data used for processing by the processor, and the like may be stored. The storage device 35 may store various parameters (for example, learned parameters, hyperparameters, or the like of deep neural networks) of a machine learning model for voice recognition and image recognition to be conducted by the control unit 30. A communication unit 36 is a communication device connectable with a network 140 via wireless communication such as Wi-Fi or 5th generation mobile communication.

A direction indicating switch 37 is a switch for a user to instruct the vehicle 100 to make a left turn or a right turn. When either the left turn or the right turn is instructed by the direction indicating switch 37, the control unit 30 identifies a place where it is possible to make the left turn or the right turn in accordance with the instruction, determines a path to be planned to travel, and controls making the left turn or the right turn. The direction indicating switch 37 may be a switch on a lever, or may be a joystick. In addition, instead of a mechanical or electronic switch, an instruction to make a left turn or a right turn may be received by voice recognition. The path to be planned to travel will be referred to as a course in the present embodiment. The course may be referred to as a path, a route, a traveling line, or the like.

Functional Configuration of Control Unit

Figure 3:
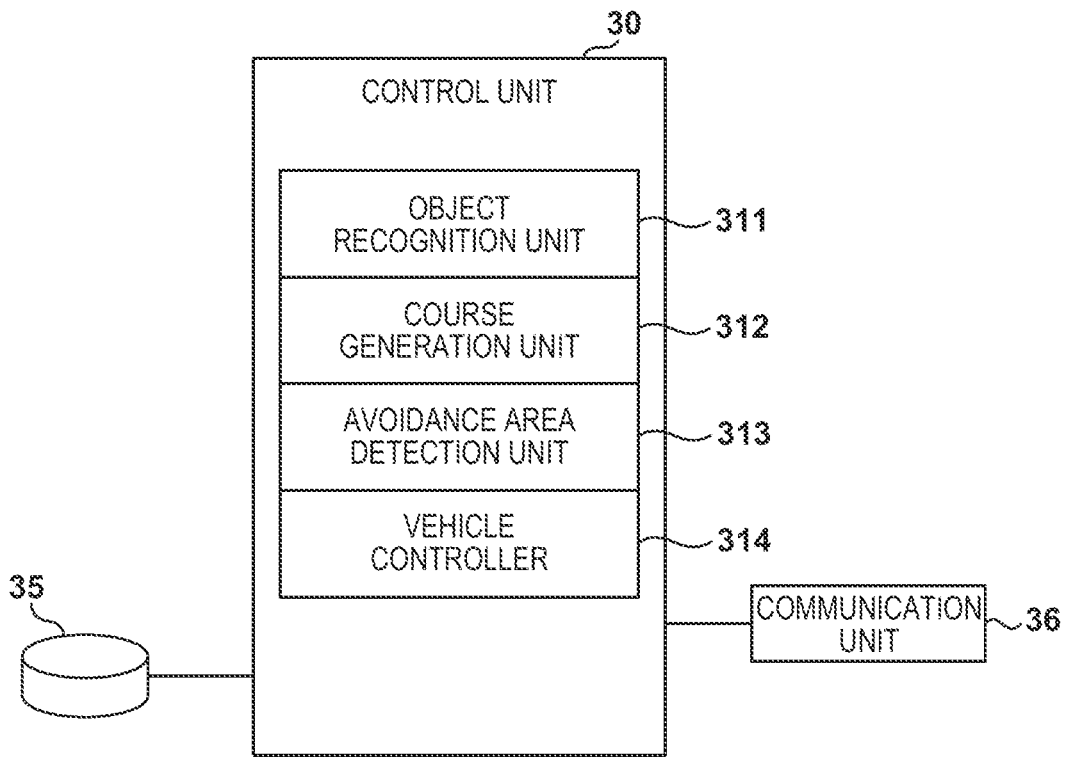
FIG. 3 is a block diagram illustrating a configuration example of a control function according to the present embodiment.

Next, referring to FIG. 3, a functional configuration example of the control unit 30 will be described. Note that each functional unit is implemented by the control unit 30, in particular, by executing a program on a CPU or an ECU included therein.

An object recognition unit 311 performs image recognition on an image that has been captured by the detection unit 15, and recognizes and outputs an object included in the image. Recognition targets include, for example, a road, crossroads, a vehicle, a pedestrian, a traffic signal, a traffic sign, an obstacle, and the like. Each recognition target includes a more detailed recognition target. Examples of the road include a road boundary between the road and the outside of the road, a white line including a center line to be sectioned into traffic lanes, a road shoulder line, a stop line, and the like, a crosswalk, and the like. In addition, for example, in a case of crossroads, a road entrance serving as a connection part between crossroads and a road is included. The image recognition is performed, for example, by comparison with an image of an object known beforehand, but the comparison may be made, based on a feature quantity of an edge or the like that has been extracted from the image. Furthermore, learning for recognizing objects from teacher images may be performed in machine learning, and the objects may be recognized by using a learned model.

In the present embodiment, for example, a captured image is converted into a top view plane by projective transformation or the like, and each object that has been recognized is arranged on such a plane. This captured image that has been planarized is a locally captured map from the vehicle 100, and will be referred to as a local map here. In the local map, for example, the position of the vehicle 100 may be set as a reference position. In addition, a reference direction may be, for example, magnetic north or may be an optical axis direction of a camera that is the detection unit 15. Accordingly, positions and directions of crossroads, roads, and road entrances and white lines included in them are identified on the local map. Note that the captured image is planarized here, but the captured image may be used as a local map without change, and the recognized object may be identified on the local map.

Note that the crossroads to be a recognition target in the present embodiment refers to a road structure in which a vehicle is capable of selecting an advancing direction and making a left turn or a right turn, and includes a four-way road such as right-angle crossroads, and in addition, the three-way road and crossroads where the number of crossing roads is larger than that of the four-way road. The crossroads are recognized, and then it becomes possible to identify a road entrance serving as an entrance and a road entrance serving as an exit, and it becomes possible to determine a course on which the self-vehicle should travel, together with the center line on the road that has been recognized. For example, when the vehicle travels on a left side, a traffic lane on the left side of the center line among the road entrances serving as the entrances becomes a traffic lane for entering the crossroads, and it is possible to set a course in it. A traffic lane is an area interposed between the center line and a road shoulder line, and a traffic lane corresponding to the advancing direction of the self-vehicle will be referred to as a current traffic lane, and a traffic lane in which a vehicle is traveling opposite to the advancing direction of the self-vehicle will be referred to as an opposite traffic lane, in some cases. In addition, a road entrance serving as an entrance to crossroads and a road entrance serving as an exit will be respectively referred to as an entrance of the crossroads and an exit of the crossroads. Furthermore, a traffic lane of a movement destination to which the vehicle is intending to travel after passing through the crossroads will be referred to as an intended traffic lane, in some cases. In addition, a traffic lane will be referred to as a traveling area, in some cases. Furthermore, courses that have been respectively determined in the current traffic lane and the intended traffic lane will be referred to as a current course and an intended course, in some cases.

A course generation unit 312 determines a course on which the vehicle 100 is going to travel on a local map, and creates and outputs course information of the course that has been determined. The course will also be referred to as a trajectory, a traveling line, a path, or the like. The course information is expressed by a point sequence (or a vector) by which a position is identified in a coordinate system of the local map. A space between the points may be a constant value (that is, a predetermined value). However, the space between the points may be changed in accordance with a predicted speed in consideration of controlling traveling along the trajectory that has been determined. That is, the space between the points may be determined so that a time interval at which the vehicle passes through each point becomes constant. In a case where the space between the points is set to a predetermined distance, the space between the points may be determined with a speed while traveling at low speed, for example, a speed when making a turn at the crossroads to a driving traffic lane side (for example, making a left turn), as a reference. Specifically, for example, the space may be approximately a vehicle body length.

Regarding a course, for example, in a case of a road without a branch, the course for the vehicle to travel on is set at the center in a width direction of the current traffic lane or to be closer to the road shoulder than to the center. In addition, in a similar manner to the traffic lane after passing through the crossroads, the course for the vehicle to travel on is set at the center or to be closer to the road shoulder than to the center in the width direction of the intended traffic lane. At the crossroads, for example, a single curve having a constant curvature that smoothly connects straight lines may be configured. Instead of the single curve, a clothoid curve, a Bezier curve, or the like may be used. The course is finally determined, and then the course generation unit 312 generates, as the course information, a point sequence along the course that has been determined. Before the course is finally determined, the presence or absence of interference between the generated course (referred to as a candidate course) and an avoidance target area such as the center of crossroads, a road shoulder, or an obstacle is determined. In a case where there is interference with any of them, a candidate course is generated again. The candidate course without interference becomes the course finally.

Unless instructed by an occupant, the course generation unit 312 generates a course for traveling along the road that has been recognized by the object recognition unit 311. Even though crossroads are recognized on a forward side, in a case where it is possible to travel straight ahead through the crossroads and there is no particular instruction, a course for traveling straight ahead through it is generated. In this case, the intended traffic lane becomes a traffic lane for traveling straight ahead after passing through the crossroads. In addition, in a case where the direction indicating switch 37 is operated to give an instruction to make a left turn or a right turn and the crossroads are recognized on a forward side, a course for making a turn to an instructed direction at the crossroads is selected. In this case, out of the roads connected with the crossroads, a traffic lane present in the instructed direction and connected with the current traffic lane becomes the intended traffic lane. In the present embodiment, there is no intention to handle a case where the instruction by the occupant is not consistent with the road structure. However, in such a case, it is sufficient to select a safest course from options including stopping.

An avoidance area detection unit 313 detects an avoidance target area in which the above-described interference with the vehicle is determined from among the objects that have been recognized by the object recognition unit 311. The avoidance target area may be determined beforehand. The avoidance target area includes the center of crossroads, a road shoulder line, and any other obstacle.

A vehicle controller 314 controls traveling of the vehicle 100 along the course information that has been generated by the course generation unit 312. Control targets include the steering mechanism 22 and the drive mechanism 23, and a steering angle and a speed of the vehicle 100 including starting to move and stopping are controlled. The vehicle 100 may be controlled so that, for example, a central portion of its front end moves on the course. In the present example, the vehicle controller 314 mainly controls traveling, and thus will also be referred to as a travel controller.

Determination of Course when Making Turn Toward Opposite Traffic Lane Side at Crossroads Next, referring to FIGS. 4A, 4B, and 5, determination of the course by the vehicle 100 in the present embodiment will be described. Note that here, it is assumed that the vehicle travels on the left side of the road in the advancing direction. However, in a case where the vehicle travels on the right side, it is sufficient if the left and right are replaced with each other in the following description. In addition, in the present example, a road to be sectioned by a center line into one traffic lane on each side will be described as an example.

Figure 4A:
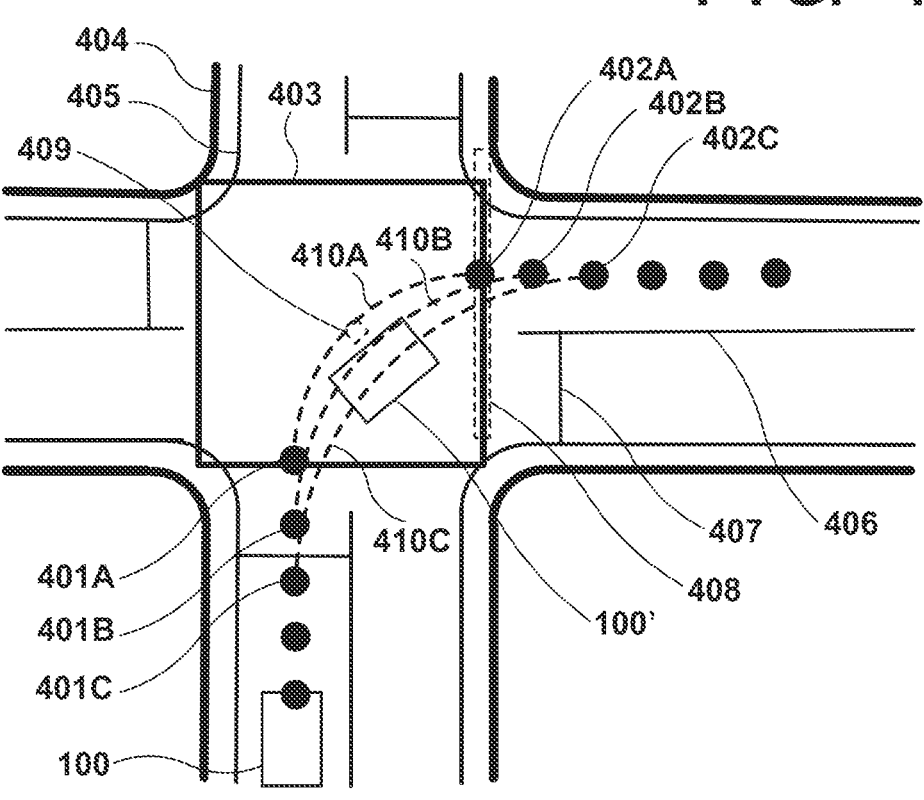
FIGS. 4A and 4B are diagrams each illustrating an example of course generation at crossroads according to the present embodiment.

FIG. 4A illustrates an example of a course illustrated on a local map when making a right turn at the crossroads. Note that the vehicle 100 does not have to be present on the map, but is illustrated here for convenience of description. Objects that have been recognized are crossroads 403 and roads connected with the crossroads 403. Inside the roads, objects such as a road boundary 404, a road shoulder line 405, a center line 406, and a stop line 407 are further recognized. In addition, a road entrance 408 is recognized as a connection area between the crossroads 403 and a road. The outside of the road shoulder line 405 may be recognized as a road shoulder. Note that only one reference numeral is assigned to each of the above-described objects in the drawing. However, in a case where a plurality of objects are present, they are recognized in each road connected with the crossroads 403.

A crossroads center 409 is an area located in the center of the crossroads 403. In a case where a graphic symbol for guiding a right turn, for example, an asteroid is illustrated at the center of the crossroads, it may be recognized as the crossroads center 409. In addition, in a case where there is no object indicating the center of the crossroads, the center of gravity of a crossroads object may be obtained to be set as the center of the crossroads. In this case, the crossroads center 409 may be a point instead of an area. Note that in a case of a four-way road, the crossroads object is rectangular, and thus an intersecting point of the orthogonal lines may be set as the center. The center of the crossroads may not be necessarily determined for a three-way road. In a case of a five-way road or more, the center of gravity may be obtained in accordance with the shape of the crossroads.

On the local map including the road and the crossroads that have been recognized in this manner, the course information of the course in the current traffic lane (that is, the traveling area where the self-vehicle is traveling) from the current position of the vehicle 100 to the position of entering the crossroads is generated as a first point sequence 401 from a point 401A to a point 401C. The course may be determined to be the center of the traffic lane or to be closer to the road shoulder than to the center or to be closer to the center line. There is an instruction to make a right turn and the road after making the right turn at the crossroads 403 is recognized, and then course information of a course in an intended traffic lane, that is, in a traffic lane of a movement destination is generated as a second point sequence 402 from the point 402A to the point 402C. The second point sequence 402 of the course information after making the right turn is generated in a range where it was possible for cameras of the detection units 15 and the detection unit 16 to capture images. Therefore, as getting closer to the crossroads, the range becomes wider, and it becomes possible to generate the course information further ahead.

Here, the first point sequence 401, which is the course in the traffic lane in which the vehicle is currently traveling, and the second point sequence 402, which is the course in the traffic lane after making the right turn, are generated (or have been generated), and then a curve connecting them is determined as a first candidate course. The course connecting the current traffic lane and the intended traffic lane may be a single curve in the present example. That is, the course indicated by the first point sequence 401 and the course indicated by the second point sequence 402 are connected by an arc having the same inclination at connection points in the respective courses. Among the points connected by the arc, a point on a current course side will be referred to as a start point, and a point on an intended course side will be referred to as an end point. Regarding the points initially selected as the start point and the end point, in the present example, at least one of them is located on a road entrance. In addition, the other one of them is assumed to be a point on the road entrance connectable with the point on the road entrance in a single curve or a point on a course in a traffic lane connected with the road entrance. Selection of the points to be initially connected will be described later again with reference to FIG. 5. Note that a position at which the course of the current traffic lane reaches the road entrance of the crossroads will be referred to as an end position of the current traffic lane, and a position at which the course of the intended traffic lane starts from the road entrance of the crossroads will be referred to as a start position of the intended traffic lane.

In the example of FIG. 4A, the points initially selected as the start point and the end point are points respectively located on the road entrances in both the first point sequence and the second point sequence, and they are the point 401A and the point 402A. In this situation, the center of a single curve 410A connecting the start point and the end point is a lower right corner point of the crossroads 403.

The course of the single curve connecting the start point and the end point is determined, and then interference between the vehicle 100 traveling on the course and the avoidance target area (also referred to as an avoidance area) is determined. This determination may be made by determining whether a minimum distance between the avoidance target area and the course is equal to or longer than a predetermined distance. In a case where the minimum distance between the avoidance target area and the course is shorter than the predetermined distance, it can be determined that the vehicle 100 traveling along the course will interfere with the avoidance target area. Therefore, the predetermined distance is at least a half the vehicle width of the vehicle 100, or may be a value obtained by adding a margin to it. The avoidance target area includes the crossroads center 409. In addition, the avoidance target area may include the road shoulder line 405, and may further include the center line 406. Note that a state in which the minimum distance between the avoidance target area and the course is shorter than the predetermined distance herein will be referred to as the avoidance target area and the course interfering with each other.

In a case where it is determined that there is no interference, the course information including a point sequence on the course is generated, based on the course. Accordingly, the course information includes the course of the traveling traffic lane in which the vehicle is currently traveling and the course of the traffic lane after making a right turn that are all indicated by the point sequences. The vehicle 100 is controlled to travel along the course, based on the course information.

On the other hand, in a case where it is determined that there is the interference, a new candidate course is determined. For this purpose, first, in the first point sequence, a point adjacent to the current start point and located at a position farther from the crossroads than the current start point is selected as a new start point. In addition, in the second point sequence, a point adjacent to the current end point and located at a position farther from the crossroads than the current end point is selected as a new end point. Then, a single curve connecting such a start point and such an end point is determined as a next candidate course. Then, as described above, the interference with the avoidance target area is determined. In a case where there is no interference, the course information is generated in the manner described above, whereas in a case where there is the interference, a new start point and a new end point are selected, and a next candidate course is determined.

In the example of FIG. 4A, in a case where the course of the single curve 410A connecting the start point 401A and the end point 402A interferes with the crossroads center 409, the start point 401B and the end point 402B are selected again, and a single curve 410B is determined as a course connecting them. In a case where there is still the interference, the start point 401C and the end point 402C are selected again, and a single curve 410C is determined as a course connecting them. In the example of FIG. 4A, a vehicle 100' traveling on this course does not interfere with the crossroads center 409, the single curve 410C is finally determined as the course, and its course information is generated.

Note that in the present embodiment, in a case where the course that has been determined and the avoidance target area interfere with each other, both the start point and the end point of the single curve are selected again. However, one of them may be selected again. In addition, the course information as described above is generated, while the vehicle 100 is traveling. Therefore, the points to be selectable from the first point sequence 401 are limited to points located between the vehicle 100 and the road entrance of the crossroads 403 in the currently traveling traffic lane, and the number of points decreases as the vehicle travels. Therefore, in a case where there is no point to be selectable again as the start point, only the end point may be selected again.

Selection of First Start Point and First End Point

Here, referring to FIG. 5, an example of a method for selecting a first start point and a first end point will be described. FIG. 5 illustrates a four-way road in which FIG. 4A is more generalized. In FIG. 5, roads that cross each other are not orthogonal to each other, and road widths are different from each other. In FIG. 5, a point 501A is an end position of the current traffic lane in which the self-vehicle is currently traveling, and a point 502A is a start position in the intended traffic lane to be a movement destination after making a right turn. Due to a difference in the road width, these points are not connectable by a single curve as a start point and an end point. The points to be connectable by a single curve are points that are equal in distance from an intersecting point (crossing point) of an extension line of the course of the current traffic lane and an extension line of the course of the traffic lane after making a right turn. Therefore, an intersecting point 510 between the extension line of the course of the current traffic lane and the extension line of the course of the traffic lane after making the right turn is determined, a distance de between the intersecting point 510 and the start point 501A and a distance dt between the intersecting point 510 and the end point 502A are obtained, and they are compared with each other. In a case where they have the same values, that is, in a case where a difference is equal to or smaller than a predetermined value, it is possible to connect the start point 501A and the end point 502A in an arc. Thus, they are respectively selected as the start point and the end point, and the course is determined in the manner described with reference to FIG. 4A.

On the other hand, in a case where the difference between the distance de and the distance dt is larger than the predetermined value, the start point or the end point is selected again in accordance with one of the distances. In FIG. 5, since de<dt is satisfied, an end point 502B at which the distance from the intersecting point 510 becomes de is selected again in accordance with de, or a start point 501B at which the distance from the intersecting point 510 becomes dt is selected again in accordance with dt. However, in the former method, the end point is located inside the crossroads, the curvature of the curve increases, and interference with the center of the crossroads will easily occur. Therefore, such an end point may be selected again. However, in the present example, in accordance with one point having a longer distance from the intersecting point 510, the other point is selected again. In the example of FIG. 5, the start point 501B at which the distance from the intersecting point 510 becomes dt is selected again in accordance with the longer distance dt. Accordingly, it becomes easy to avoid the interference between the center of the crossroads and the course. Note that in a case where the position of the point that has been determined as described above does not coincide with the position of the point included in the first point sequence or the second point sequence, a point closest to the determined position may be selected from the first point sequence and (or) the second point sequence.

The center of the arc connecting the start point and the end point that have been selected in this manner corresponds to an intersecting point of straight lines passing through the respective points and orthogonal to the respective courses. In FIG. 5, in a case where the start point is 501B and the end point is 502A, the center point is a point 511B. In a case where the start point is 501A and the end point is 502B, the center point is a point 511A. In a case where the start point is 501C and an end point is 502C, the center point is a point 511C. Note that the start point 501C and the end point 502C are points to be selected again, in a case where the determined course including the start point 501B and the end point 502A interferes with the center of the crossroads.

Determination of Course for Making Turn to Road Shoulder Side at Crossroads

Heretofore, the course on which the vehicle makes a right turn at the crossroads, that is, makes a turn toward an opposite traffic lane has been described. Also for a course for making a left turn, that is, for making a turn to a road shoulder side, a course for avoiding interference with the avoidance target area is selected. FIG. 4B illustrates its example.

Also in a case of making a left turn, a point sequence of the course of the traveling traffic lane and a point sequence of the course after making the left turn are connected by an arc in the same manner as the right turn to generate the course information. However, in the case of the left turn, interference with a road shoulder line (that is, a road shoulder) on the left side (turning side) of the traveling traffic lane is more likely to occur than the interference with the center of the crossroads. Therefore, in a case where there is the interference with the road shoulder, the start point and the end point are selected again so as to increase the curvature of the curve in making a turn at the crossroads, that is, to reduce the radius of the single curve in order to avoid the interference. That is, points on the extension lines of the end point of the traveling traffic lane and the start point of the traffic lane after the left turn are respectively selected again, and a curve connecting these points is determined as a new course.

Figure 4B:
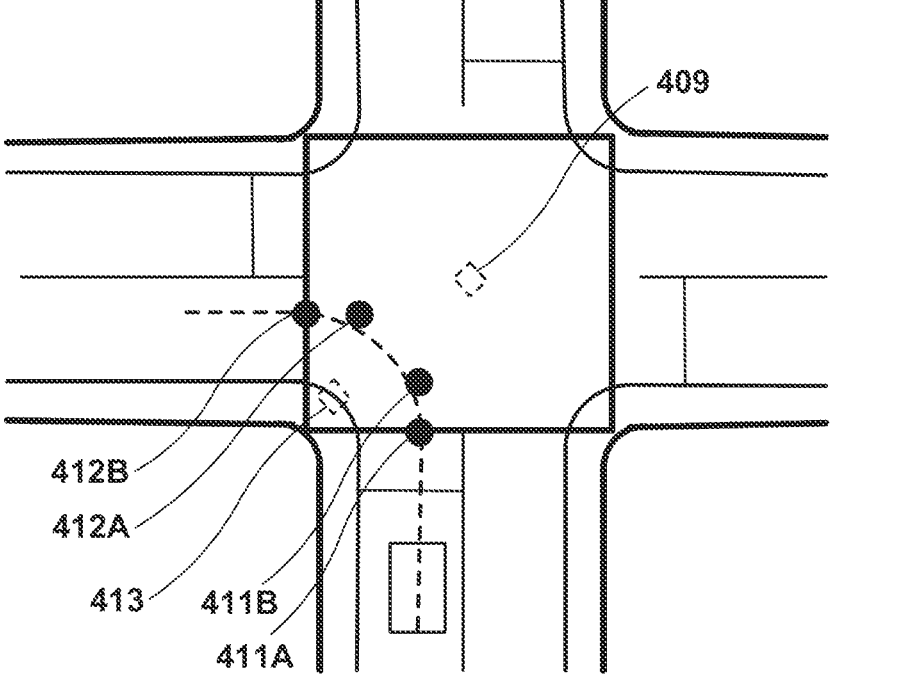

In the example of FIG. 4B, in addition to the crossroads center 409, interference with a road shoulder 413 is also determined. In a case where it is determined that there is interference, a point 411B and a point 412A, which are extended points in the crossroads of a first start point 411A and a first end point 412B, are respectively selected again as the start point and the end point. Then, a curve connecting the start point and the end point is determined as the new course. Note that in FIG. 4B, a central part of the road shoulder within the crossroads that is considered to be likely to interfere is used as the road shoulder 413. However, the entire area outside the road shoulder line may be set as the avoidance target area. The minimum distance between such an avoidance target area and the curve connecting the start point and the end point that are selected is compared with a predetermined value (a half the vehicle width plus a margin), and the interference is determined. This is similar to the case of the crossroads center.

Note that in a case where the course of a single curve having a small radius is selected as described above, the course can be a difficult one to travel on due to restrictions on the control of traveling. Therefore, in such a case, the courses of the current traffic lane and the intended traffic lane may be shifted to the center line side and set again, and the radius of the course of the single curve in making a turn at the crossroads may be increased. It is needless to say that also in this case, the course is shifted so that no interference occurs between the center line and the vehicle.

In FIG. 4A, no description has been given with regard to interference between the course and the avoidance target area other than the crossroads center, such as the road shoulder. However, the interference may also be determined for them. In a case where a plurality of avoidance target areas are considered, regeneration of a course for avoiding interference with one avoidance target area may cause interference with another avoidance target area. In such a case, priorities may be provided for the avoidance target areas beforehand, and a course that avoids interference with the avoidance target area having a higher priority may be determined on a priority basis.

Course Information Generation Processing

Figure 6:
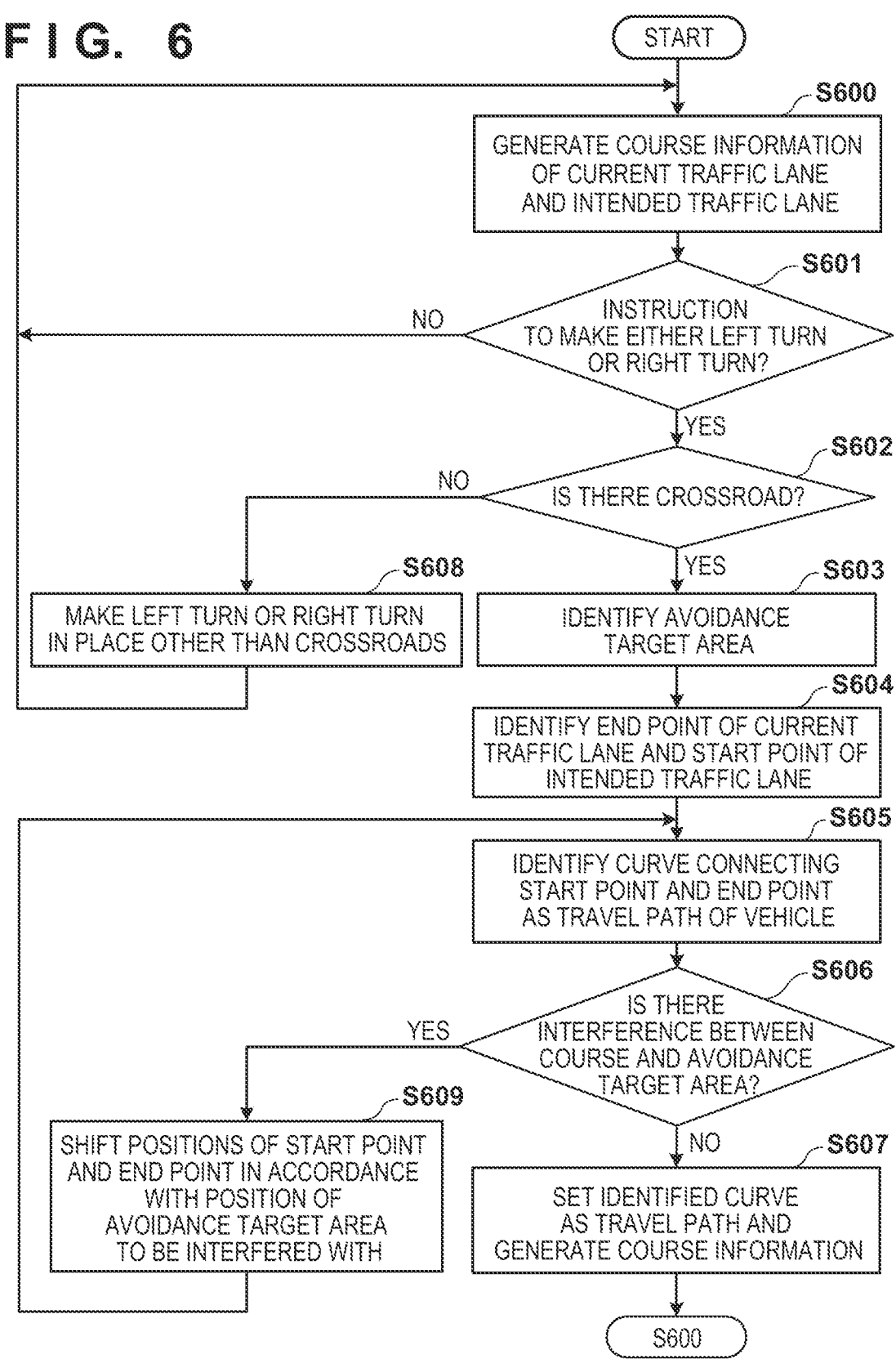
FIG. 6 is a flowchart illustrating course generation processing according to the present embodiment.

FIG. 6 illustrates an example of a flowchart summarizing the procedure of course determination and course information generation processing that have been described above. The procedure shown by FIG. 6 is achieved by the control unit 30 (also referred to as a controller), in particular, executing a program on its CPU. This processing corresponds to processing by the course generation unit 312 and the avoidance area detection unit 313 in the functional modules of FIG. 3. Image recognition processing by the object recognition unit 311 is performed asynchronously with the processing of FIG. 6. In the procedure of FIG. 6, the processing is performed with reference to a recognition result. In addition, the image recognition processing by the object recognition unit 311 and the processing in FIG. 6 are both continuously performed, while the vehicle 100 is traveling.

First, a current traffic lane and an intended traffic lane are identified from the road objects that have been recognized, and course information of a course passing on them is generated in a range of the acquired image (S600). Note that in a case where no crossroads are present, no intended traffic lane is present. Thus, only the current traffic lane may be targeted. Here, for example, the first point sequence 401 illustrated in FIG. 4A is generated. In addition, in a case where a road connected through the crossroads is recognized in the image, it is possible to identify the intended traffic lane, and thus the second point sequence 402 may also be generated. However, in this situation, it is uncertain in which direction the vehicle is going to travel through the crossroads. Therefore, the second point sequence 402 may be created with the direction of traveling straight ahead as the intended traffic lane. Alternatively, the intended traffic lanes of all roads to which the vehicle has a possibility of traveling may be determined, and the second point sequence 402 may be created for each of the intended traffic lanes.

Next, it is determined whether an instruction to make either a left turn or a right turn by the direction indicating switch 37 has been received (S601). In a case where there is no instruction to make the left turn or the right turn, step S600 is repeatedly performed. On the other hand, in a case where either the right turn or the left turn has been instructed, it is determined whether crossroads are present in an advancing course of the vehicle 100 (S602). That is, it is determined whether a crossroads object is included in the objects that have been recognized by the object recognition unit 311. In a case where no crossroads are included, it is an instruction to make the left turn or the right turn in a place other than the crossroads, an instruction to change traffic lanes, a stop instruction, or the like. Thus, a path corresponding to such an instruction is determined (S608).

In a case where it is determined in step S602 that the crossroads are present, an avoidance target area is detected and identified from among the objects that have been recognized by the object recognition unit 311 (S603). As described above, the avoidance target area includes a central area at the crossroads (the crossroads center), a road shoulder, and any other obstacle. In a case where there is an object (for example, an asteroid figure) indicating it at the crossroads center, such an object is set to be the avoidance target area as the crossroads center. However, in a case where there is no such an object, the center of gravity of the crossroads is obtained, and the center of gravity is identified as the crossroads center. In the case of a four-way road, such crossroads often have a point symmetrical structure with the crossroads center as a symmetrical point. Thus, this is usually sufficient. Regarding asymmetric crossroads, the position of the crossroads center may be adjusted by shifting the center of gravity that has been obtained in accordance with deviation of the center line, with reference to the center lines of the roads or the like.

Next, a point sequence indicating the course of the current traffic lane and a point sequence indicating the course of the intended traffic lane are determined, and points in contact with the crossroads are respectively identified as a start point and an end point (S604). The course of the current traffic lane and the course of the intended traffic lane are connected by a single curve in the present example. Thus, a crossing point is determined from the respective courses, and the start point and the end point are determined so as to be equal to each other from the crossing point. The way of determining in this manner has been described with reference to FIG. 5.

In a case where the start point and the end point have been determined, a curve connecting them, here, an arc constituting a single curve is determined (S605). The center and the radius define the arc, but its center is an intersecting point of a line that passes through the start point and that is orthogonal to the course of the current traffic lane and a line that passes through the end point and that is orthogonal to the course of the intended traffic lane. The radius is a distance from the center to the start point or the end point.

Next, it is determined whether there is interference between the course that has been determined and an avoidance target area (S606). As described above, in a case where the minimum distance between the course and the avoidance target area does not exceed a predetermined value that is at least a half the vehicle width of the vehicle 100, it is determined that there is interference. In the present example, the avoidance target area includes the crossroads center and the road shoulder. However, any other obstacle or the like may also be included as the avoidance target area.

In a case where it is determined in step S606 that there is interference, the positions of the start point and the end point are shifted in accordance with the position of the avoidance target area to be interfered with (S609). In a case where the vehicle makes a right turn and the avoidance target area is the crossroads center, the start point and the end point are changed so that the vehicle makes a turn with a larger radius from a position farther from the crossroads center. This has been as described with reference to FIG. 4A. In a case where the vehicle makes a left turn and the avoidance target area is a road shoulder, the start point and the end point are changed so that the vehicle makes a turn with a smaller radius from a position closer to the crossroads center. This has been as described with reference to FIG. 4B. Then, the processing returns to step S605, a curve connecting the start point and the end point that have been selected again is identified, and subsequent processing is repeated. That is, the start point and the end point are selected again, and the course information is generated again so as not to interfere with the avoidance target area.

In a case where it is determined in step S606 that there is no interference, the course that has been determined until then does not interfere with the avoidance target area. Therefore, the course information is generated from such a course (S607). That is, a point sequence on the course that has been determined is generated. Each point in the point sequence may be indicated by a position on a local map. Then, the processing returns to step S600.

With reference to the course information that has been generated in the above procedure, the vehicle controller 314 controls the steering of the vehicle 100 to travel on the course that has been determined. It is determined that the course does not interfere with the avoidance target area. Therefore, by traveling along the course, it becomes possible to avoid interference with the avoidance target area, for example, to avoid moving onto the crossroads center or the road shoulder.

In this manner, it is possible to determine a course that does not interfere with the avoidance target area, when making a turn in the crossroads. More specifically, in making a turn toward an opposite traffic lane side at the crossroads, it is possible to determine the course so as not to interfere with the crossroads center. In addition, in making a turn toward the road shoulder side at the crossroads, it is possible to determine the course so as not to interfere with the road shoulder. Accordingly, the vehicle is capable of traveling safely in compliance with traffic regulations.

Summary of Embodiments

1. Provided is a course generation device that generates course information indicating a course on which a moving body moves from a traveling area where the moving body is traveling to a traveling area of a movement destination, the course generation device comprising:
   at least one processor and at least one memory comprising at least one program, wherein the at least one program is configured to cause the one or more processors to:
   output a course in the traveling area where the moving body is traveling and a course in a traveling area of the movement destination respectively in a first point sequence and a second point sequence;
   generate the course information of the course on which the moving body moves from the traveling area where the moving body is traveling to the traveling area of the movement destination, as a curve including a point in the first point sequence as a start point and a point in the second point sequence as an end point;

estimate or detect an avoidance area to be avoided in traveling, based on an image captured by a camera; and
   select again at least one of the start point and the end point, in a case where a distance between the avoidance area and the course is shorter than a predetermined distance, and generate again the course information for the distance to be equal to or longer than the predetermined distance.

This configuration enables generation of the course that does not interfere with the avoidance area, from the traveling area to the area of the movement destination.

2. Provided is the course generation device according to article 1, wherein the avoidance area includes at least one of a center of crossroads and a road shoulder.

This configuration enables generation of the course that does not interfere with at least one of the center of the crossroads and the road shoulder, from the traveling area to the area of the movement destination.

3. Provided is the course generation device according to article 1, wherein the start point is a point at an end position of the traveling area where the moving body is traveling, or the end point is a point at a start position of the traveling area of the movement destination.

This configuration enables generation of the course that does not interfere with the avoidance area, from the point at the end position of the traveling area to the point at the start position of the area of the movement destination.

4. Provided is the course generation device according to claim 3, wherein
   in a case where the start point is the point at the end position of the traveling area where the moving body is traveling, the end point is a point included in the second point sequence and connected with the start point by a single curve, and
   in a case where the end point is the point at the start position of the traveling area of the movement destination, the start point is a point included in the first point sequence and connected with the end point by a single curve.

This configuration enables generation of the course that is connected by the single curve and that does not interfere with the avoidance area, from the traveling area to the area of the movement destination.

5. Provided is the course generation device according to claim 1, wherein when the moving body moves across an opposite traffic lane, in the case where the distance between the avoidance area and the course is shorter than the predetermined distance, at least one of the start point and the end point is selected again for the start point and the end point to be more separated from each other.

This configuration enables generation of the course that does not interfere with the avoidance area, from the traveling area to the area of the movement destination, when the moving body moves across the opposite traffic lane, while confirming the presence or absence of interference with the avoidance area.

6. Provided is the course generation device according to claim 1, wherein when the moving body moves without moving across an opposite traffic lane, in the case where the distance between the avoidance area and the course is shorter than the predetermined distance, at least one of the start point and the end point is selected again for the start point and the end point to be closer to each other.

This configuration enables generation of the course that does not interfere with the avoidance area, from the traveling area to the area of the movement destination, when the moving body moves without moving across the opposite traffic lane, while confirming the presence or absence of interference with the avoidance area.

7. Provided is the course generation device according to claim 1, wherein the curve includes a single curve connecting either the course in the traveling area where the moving body is traveling or an extension line of the course and either the course in the traveling area of the movement destination or an extension line of the course.

This configuration enables generation of the course including the straight line and the single curve that do not interfere with the avoidance area, from the traveling area to the area of the movement destination.

8. Provided is the course generation device according to claim 1, wherein a central part of the moving body travels along the course, and the predetermined distance is at least a half a width of the moving body.

This configuration enables generation of the course for the vehicle to travel on that does not interfere with the avoidance area, from the traveling area to the area of the movement destination.

9. Provided is the course generation device according to claim 1, wherein the traveling area of the movement destination is connected, through either a left turn or a right turn to be made at crossroads, from the traveling area where the moving body is traveling.

This configuration enables generation of the course that does not interfere with the avoidance area, from the traveling area to the area of the movement destination that are connected by making a left turn or a right turn at the crossroads.

10. Provided is a moving body comprising:

a course generation device configured to generate course information indicating a course on which the moving body moves from a traveling area where the moving body is traveling to a traveling area of a movement destination; and a travel controller configured to control traveling along the course indicated by the course information generated by the course generation device, the course generation device comprising:

at least one processor and at least one memory comprising at least one program, wherein the at least one program is configured to cause the one or more processors to:

output a course in the traveling area where the moving body is traveling and a course in a traveling area of the movement destination respectively in a first point sequence and a second point sequence;

generate the course information of the course on which the moving body moves from the traveling area where the moving body is traveling to the traveling area of the movement destination, as a curve including a point in the first point sequence as a start point and a point in the second point sequence as an end point;

estimate or detect an avoidance area to be avoided in traveling, based on an image captured by a camera; and select again at least one of the start point and the end point, in a case where a distance between the avoidance area and the course is shorter than a predetermined distance, and generate again the course information for the distance to be equal to or longer than the predetermined distance.

This configuration enables the moving body to travel on the course that does not interfere with the avoidance area, from the traveling area to the area of the movement destination.

11. Provided is a program for causing a computer to function as a course generation device configured to generate course information indicating a course on which a moving body moves from a traveling area where the moving body is traveling to a traveling area of a movement destination, the program causing the computer to execute to:

output a course in the traveling area where the moving body is traveling and a course in a traveling area of the movement destination respectively in a first point sequence and a second point sequence;

generate the course information of the course on which the moving body moves from the traveling area where the moving body is traveling to the traveling area of the movement destination, as a curve including a point in the first point sequence as a start point and a point in the second point sequence as an end point;

estimate or detect an avoidance area to be avoided in traveling, based on an image captured by a camera; and select again at least one of the start point and the end point, in a case where a distance between the avoidance area and the course is shorter than a predetermined distance, and generate again the course information for the distance to be equal to or longer than the predetermined distance.

According to this configuration, the program enables traveling on the course that does not interfere with the avoidance area, from the traveling area to the area of the movement destination.

12. Provided is a course generation method, to be performed by a control device including a course generation unit and an avoidance area detection unit, for generating course information indicating a course on which a moving body moves from a traveling area where the moving body is traveling to a traveling area of a movement destination, the course generation method comprising:

outputting, by the course generation unit, a course in the traveling area where the moving body is traveling and a course in a traveling area of the movement destination respectively in a first point sequence and a second point sequence, and generating the course information of the course on which the moving body moves from the traveling area where the moving body is traveling to the traveling area of the movement destination, as a curve including a point in the first point sequence as a start point and a point in the second point sequence as an end point;

estimating or detecting, by the avoidance area detection unit, an avoidance area to be avoided in traveling, based on an image captured by a camera; and selecting again, by the course generation unit, at least one of the start point and the end point, in a case where a distance between the avoidance area and the course is shorter than a predetermined distance, and generating again the course information for the distance to be equal to or longer than the predetermined distance.

This configuration enables generation of the course that does not interfere with the avoidance area, from the traveling area to the area of the movement destination.

The invention is not limited to the foregoing embodiments, and various variations/changes are possible within the spirit of the invention.

What is claimed is:

1. A course generation device that generates course information indicating a course on which a moving body moves from a traveling area where the moving body is traveling to a traveling area of a movement destination, wherein the course information is provided to the moving body, the course generation device comprising:

a camera on the moving body for capturing an image of a travelling direction of the moving body; and at least one processor and at least one memory comprising at least one program, wherein the at least one program is configured to cause the one or more processors to:

output a course in the traveling area where the moving body is traveling and a course in a traveling area of the movement destination respectively in a first point sequence and a second point sequence on a local map converted from an image captured by the camera;

select a start point in the first point sequence and an end point in the second point sequence;

generate the course information of the course on which the moving body moves from the traveling area where the moving body is traveling to the traveling area of the movement destination, as a curve including the start point and the end point;

estimate or detect an avoidance area to be avoided in traveling, based on an image captured by the camera;

select again at least one of the start point in the first point sequence and the end point in the second point sequence, in a case where a distance between the avoidance area and the course is shorter than a predetermined distance, and generate again the course information for the distance to be equal to or longer than the predetermined distance; and control traveling of the moving body along the generated course information, wherein when the moving body moves without moving across an opposite traffic lane, in the case where the distance between the avoidance area and the course is shorter than the predetermined distance, at least one of the start point and the end point is selected again for the start point and the end point to be closer to each other to reduce the radius of the curve.

2. The course generation device according to claim 1, wherein the avoidance area includes at least one of a center of crossroads and a road shoulder.

3. The course generation device according to claim 1, wherein the start point is a point at an end position of the traveling area where the moving body is traveling, or the end point is a point at a start position of the traveling area of the movement destination.

4. The course generation device according to claim 3, wherein in a case where the start point is the point at the end position of the traveling area where the moving body is traveling, the end point is a point included in the second point sequence and connected with the start point by a single curve, and in a case where the end point is the point at the start position of the traveling area of the movement destination, the start point is a point included in the first point sequence and connected with the end point by a single curve.

5. The course generation device according to claim 1, wherein when the moving body moves across an opposite traffic lane, in the case where the distance between the avoidance area and the course is shorter than the predetermined distance, at least one of the start point and the end point is selected again for the start point and the end point to be more separated from each other.

6. The course generation device according to claim 1, wherein the curve includes a single curve connecting either the course in the traveling area where the moving body is traveling or an extension line of the course and either the course in the traveling area of the movement destination or an extension line of the course.

7. The course generation device according to claim 1, wherein a central part of the moving body travels along the course, and the predetermined distance is at least a half a width of the moving body.

8. The course generation device according to claim 1, wherein the traveling area of the movement destination is connected, through either a left turn or a right turn to be made at crossroads, from the traveling area where the moving body is traveling.

9. The course generation device according to claim 1, wherein a space between the points in the first point sequence and the second point sequence is determined so that a time interval at which the moving body passes through each point becomes constant.

10. A moving body comprising:

a course generation device configured to generate course information indicating a course on which the moving body moves from a traveling area where the moving body is traveling to a traveling area of a movement destination, wherein the course information is provided to the moving body; and a travel controller configured to control traveling along the course indicated by the course information generated by the course generation device, the course generation device comprising:

a camera on the moving body for capturing an image of a travelling direction of the moving body; and at least one processor and at least one memory comprising at least one program, wherein the at least one program is configured to cause the one or more processors to:

output a course in the traveling area where the moving body is traveling and a course in a traveling area of the movement destination respectively in a first point sequence and a second point sequence on a local map converted from an image captured by the camera;

select a start point in the first point sequence and an end point in the second point sequence;

generate the course information of the course on which the moving body moves from the traveling area where the moving body is traveling to the traveling area of the movement destination, as a curve including the start point and the end point;

estimate or detect an avoidance area to be avoided in traveling, based on an image captured by the camera; and select again at least one of the start point in the first point sequence and the end point in the second point sequence, in a case where a distance between the avoidance area and the course is shorter than a predetermined distance, and generate again the course information for the distance to be equal to or longer than the predetermined distance, wherein when the moving body moves without moving across an opposite traffic lane, in the case where the distance between the avoidance area and the course is shorter than the predetermined distance, at least one of the start point and the end point is selected again for the start point and the end point to be closer to each other to reduce the radius of the curve.

11. A non-transitory computer readable storage which stores a program for causing a computer on a moving body to function as a course generation device configured to generate course information indicating a course on which the moving body moves from a traveling area where the moving body is traveling to a traveling area of a movement destination, wherein the moving body has a camera for capturing an image of a travelling direction of the moving body and the course information is provided to the moving body, the program causing the computer to execute to:

output a course in the traveling area where the moving body is traveling and a course in a traveling area of the movement destination respectively in a first point sequence and a second point sequence on a local map converted from an image captured by the camera;

select a start point in the first point sequence and an end point in the second point sequence;

generate the course information of the course on which the moving body moves from the traveling area where the moving body is traveling to the traveling area of the movement destination, as a curve including the start point and the end point;

estimate or detect an avoidance area to be avoided in traveling, based on an image captured by the camera;

select again at least one of the start point in the first point sequence and the end point in the second point sequence, in a case where a distance between the avoidance area and the course is shorter than a predetermined distance, and generate again the course information for the distance to be equal to or longer than the predetermined distance; and control traveling of the moving body along the generated course information, wherein when the moving body moves without moving across an opposite traffic lane, in the case where the distance between the avoidance area and the course is shorter than the predetermined distance, at least one of the start point and the end point is selected again for the start point and the end point to be closer to each other to reduce the radius of the curve.

12. A course generation method, to be performed by a control device on a moving body including a course generation unit and an avoidance area detection unit, for generating course information indicating a course on which the moving body moves from a traveling area where the moving body is traveling to a traveling area of a movement destination, wherein the moving body has a camera for capturing an image of a travelling direction of the moving body and the course information is provided to the moving body, the course generation method comprising:

outputting, by the course generation unit, a course in the traveling area where the moving body is traveling and a course in a traveling area of the movement destination respectively in a first point sequence and a second point sequence on a local map converted from an image captured by the camera, selecting a start point in the first point sequence and an end point in the second point sequence;

generating the course information of the course on which the moving body moves from the traveling area where the moving body is traveling to the traveling area of the movement destination, as a curve including the start point and the end point;

estimating or detecting, by the avoidance area detection unit, an avoidance area to be avoided in traveling, based on an image captured by the camera;

selecting again, by the course generation unit, at least one of the start point in the first point sequence and the end point in the second point sequence, in a case where a distance between the avoidance area and the course is shorter than a predetermined distance, and generating again the course information for the distance to be equal to or longer than the predetermined distance; and controlling traveling of the moving body along the generated course information, wherein when the moving body moves without moving across an opposite traffic lane, in the case where the distance between the avoidance area and the course is shorter than the predetermined distance, at least one of the start point and the end point is selected again for the start point and the end point to be closer to each other to reduce the radius of the curve.

* * * * *